United States Patent [19]
Anderson et al.

[11] Patent Number: 5,959,374
[45] Date of Patent: Sep. 28, 1999

[54] ELECTROMAGNETIC ACTUATOR

[75] Inventors: William G. Anderson, Victoria, Minn.; William C. McAdams, Melbourne, Fla.

[73] Assignee: MTS Systems Corporation, Eden Prairie, Minn.

[21] Appl. No.: 08/915,502

[22] Filed: Aug. 21, 1997

Related U.S. Application Data

[63] Continuation of application No. 08/484,866, Jun. 7, 1995, Pat. No. 5,661,446.

[51] Int. Cl.[6] .................................................... H02K 41/00
[52] U.S. Cl. .......................... 310/13; 318/115; 318/135; 335/229
[58] Field of Search .................................. 310/12, 13, 14; 318/135, 115; 335/179, 229, 256

[56] References Cited

U.S. PATENT DOCUMENTS

| | | | |
|---|---|---|---|
| 4,099,106 | 7/1978 | Nikaido | 318/115 |
| 4,234,831 | 11/1980 | Kemmer et al. | 318/115 |
| 4,456,934 | 6/1984 | Wedman et al. | 360/78 |
| 4,500,827 | 2/1985 | Merritt et al. | 322/3 |
| 4,535,260 | 8/1985 | Pritchard et al. | 310/12 |
| 4,607,197 | 8/1986 | Conrad | 318/115 |
| 4,870,306 | 9/1989 | Petersen | 310/12 |
| 4,912,746 | 3/1990 | Oishi | 310/12 |
| 4,945,268 | 7/1990 | Nihei et al. | 310/12 |
| 5,075,583 | 12/1991 | Sakagami et al. | 310/12 |
| 5,079,458 | 1/1992 | Schuster | 310/12 |
| 5,091,665 | 2/1992 | Kelly | 310/12 |
| 5,146,123 | 9/1992 | Yarr | 310/15 |
| 5,179,306 | 1/1993 | Nasar | 310/14 |
| 5,389,844 | 2/1995 | Yarr et al. | 310/15 |
| 5,424,592 | 6/1995 | Bluen et al. | 310/28 |
| 5,434,549 | 7/1995 | Hirabayashi et al. | 335/29 |
| 5,438,227 | 8/1995 | Satoni | 310/14 |
| 5,440,183 | 8/1995 | Denne | 310/12 |
| 5,627,418 | 5/1997 | Satomi et al. | 310/12 |
| 5,661,446 | 8/1997 | Anderson et al. | 335/229 |

OTHER PUBLICATIONS

Willaim G. Anderson, "NdFeB Magnet Material In High Performance Brushless Servo Motors", reprinted from Mar., 1992 issue of *Motion Control Magazine*, pp. 1–6.

"High–Force Actuator Operates Hydraulic Valve", Mark Gottschalk,*Design News*, Nov. 15, 1993, pp. 89–90.

"Special Linear Motor Issue—Positioning Market Is Moving Fast", *ANONEWS—The Technology Newsletter of the Anorad Corporation*, vol. 12, No. 5, Dec. 1993.

"A New Motion System For Small Simulators", Phillip R.M. Deene, Denne Developments Limited Date Unknown.

"Actuator—PEMRAM 3300/150", Denne Developments, Ltd., Bournemouth, U.K. Date Unknown.

"Linear Motion Technology Update—Better motion control", Leslie Langnau, *Power Transmission Design*, Apr. 1995, pp. 55–57.

*Primary Examiner*—Thomas M. Dougherty
*Assistant Examiner*—Judson H. Jones
*Attorney, Agent, or Firm*—Westman, Champlin & Kelly, P.A.; S. Koehler

[57] ABSTRACT

An electromagnetic actuator includes an actuator rod having a plurality of magnetic assemblies disposed about a longitudinal axis of the actuator rod. Each plurality of magnetic assemblies develops alternating magnetic flux along the longitudinal axis. The electromagnetic actuator further includes a plurality of stator windings secured to a support structure and disposed about the longitudinal axis. Each stator winding has a pole facing a portion of one of the plurality of magnetic assemblies and the longitudinal axis.

6 Claims, 11 Drawing Sheets

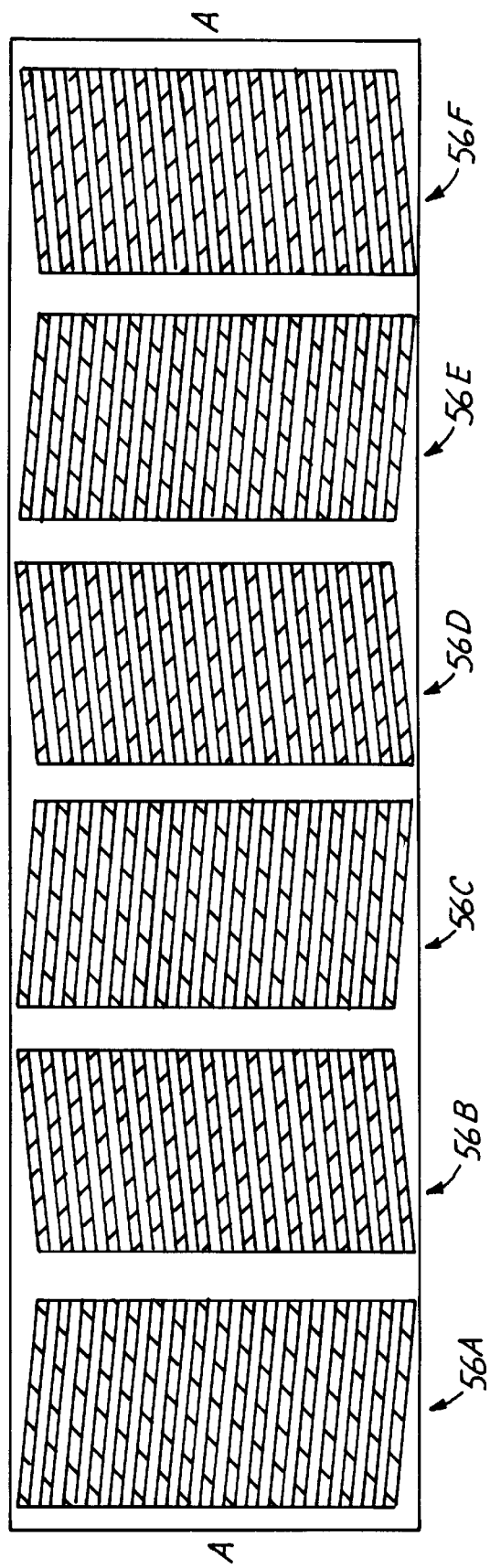

ELECTROMAGNETIC ACTUATOR

This is a continuation of application Ser. No. 08/484,866, filed Jun. 7, 1995 now U.S. Pat. No. 5,661,446.

BACKGROUND OF THE INVENTION

The present invention relates to linear electrodynamic machines, and more particularly, to an electromagnetic actuator.

Linear electric motors have increasingly been applied to a number of applications where precise displacement is required. Generally, a linear motor includes a selectively energized winding positioned in close proximity to a plurality of magnets. In many linear motors, the magnets are held stationary and the winding is energized so that magnetic fields created by the winding interact with the magnetic fields of the permanent magnets to cause displacement of the winding relative to the permanent magnets. In other motors, the magnets are disposed on a movable rod while the stator winding is held stationary.

Recently, there has been interest in replacing conventional hydraulic actuators with linear motors or, more appropriately called, electromagnetic actuators in this application. It is commonly known that although hydraulic actuators can develop high forces, hydraulic actuators typically are just a part of a larger hydraulic system that requires other complicated devices such as accumulators, filters and pumps which all must be maintained in order to operate. Furthermore, being that the hydraulic system operates using pressurized fluid, there is always the risk of a fluid leak.

Although known electromagnetic actuators can provide precise control of the moving armature, these actuators have as of yet not replaced hydraulic actuators because sufficient forces comparable to the hydraulic actuators have not yet been obtainable.

SUMMARY OF THE INVENTION

The present invention is an electromagnetic actuator and a method of making the same. The electromagnetic actuator includes an actuator rod having a plurality of magnetic assemblies disposed about a longitudinal axis of the actuator rod. Each plurality of magnetic assemblies develops alternating magnetic flux along the longitudinal axis. The electromagnetic actuator further includes a plurality of stator windings secured to a support structure and disposed about the longitudinal axis. Each stator winding has a pole facing a portion of one of the plurality of magnetic assemblies and the longitudinal axis. By disposing the stator windings and the magnetic assemblies about the longitudinal axis, forces generated in a plane perpendicular to the longitudinal axis are substantially zero, while forces generated from interaction of each energized stator winding with its corresponding magnetic assembly add together and are parallel to the longitudinal axis.

In a preferred embodiment, the armature is formed of a plurality of armature subsections and the magnetic assemblies each comprise a plurality of magnets. Each armature subsection contains a magnet from each magnetic assembly. Preferably, each armature subsection is formed of a plurality of armature laminates. The armature laminates are very thin, but when a number of these are stacked and suitably fastened together such as by gluing, each armature subsection, and thus, the armature itself is very rigid. Each armature laminate includes apertures spaced-apart at equal angular intervals. The apertures when aligned form cavities that hold the permanent magnets within the armature and, preferably, below an outer surface. The armature outer surface is then ground smooth and plated with electrolysis nickel for corrosion protection to provide a smooth surface for bearings to slide on.

To minimize the air gap between each stator winding and each corresponding magnetic assembly, each stator winding includes a stator pole face that generally conforms to the outer surface of the actuator rod. Preferably, stator pole faces are laminate structures formed by a plurality of stator pole laminates. The stator pole laminates are preferably just as thick as the armature laminates. A preferred method of making the armature laminates and the stator pole laminates so that a precision air gap results between the outer surface of the actuator rod and stator pole faces includes beginning with a plurality of laminates that have an outer portion conforming to the stator pole laminates and an inner portion conforming to the actuator rod laminates. These initial laminates are then cut, for example by stamping or by laser machining, to form the stator pole laminates and the actuator rod laminates.

In a further preferred embodiment, the armature rod is rotated as well as displaced linearly. In this preferred embodiment, a conventional brushless, direct current, stator winding assembly is disposed around the actuator rod to operate as an electric motor. The actuator rod includes a second portion having actuator rod subsections constructed in the manner described above but with magnets of the same polarity disposed parallel to the longitudinal axis to operate as a conventional motor. The second portion of the armature can be lengthened, or positioned, or additional armature portions can be added to allow the armature to be rotated at any extended condition.

BRIEF DESCRIPTION OF THE DRAWINGS

FIG. 5A is a schematic flat layout view of the stator winding cores of the stator assembly with windings and stator pole faces removed;

DETAILED DESCRIPTION OF THE PREFERRED EMBODIMENTS

Figure 1:
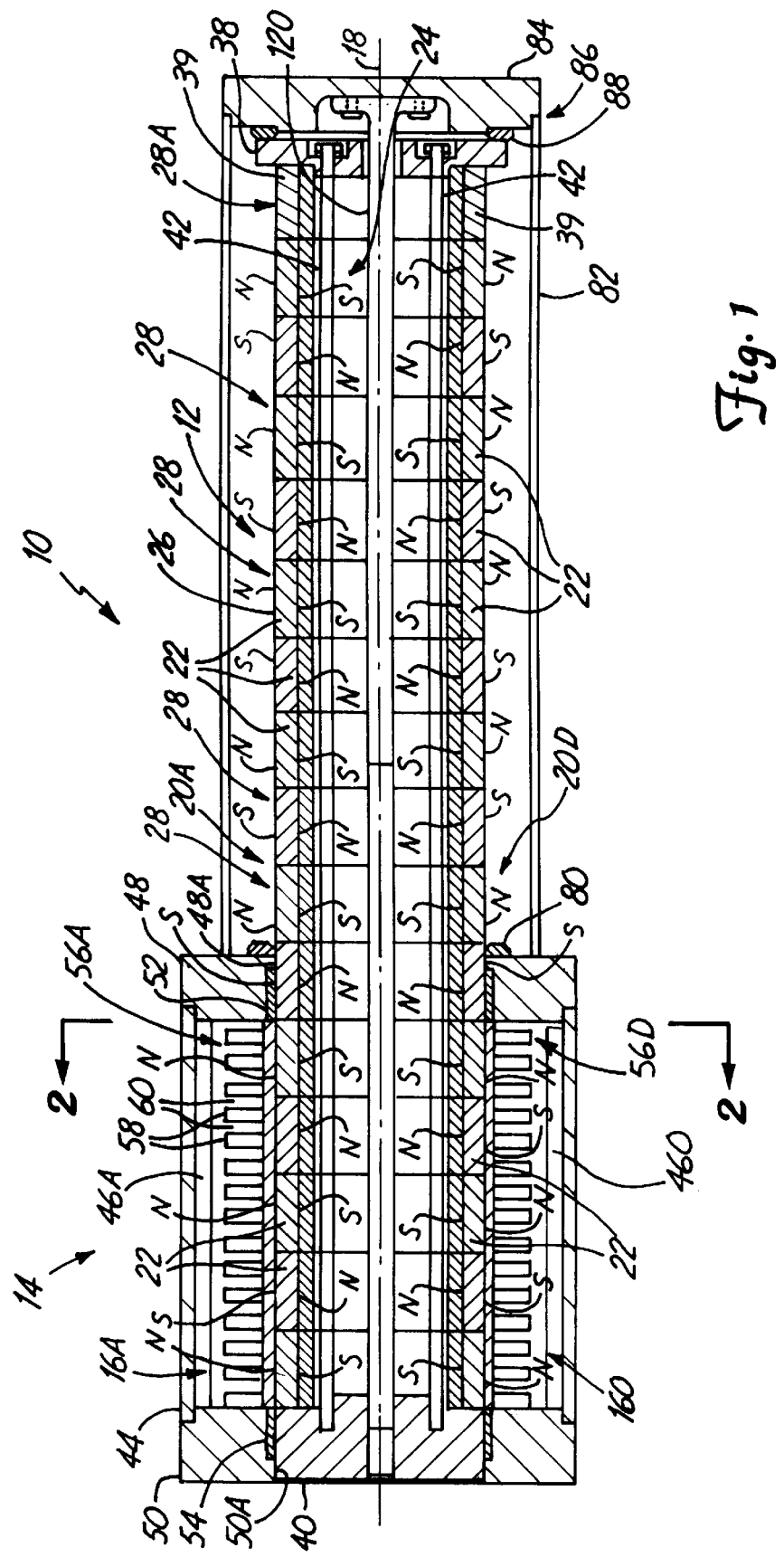
FIG. 1 is a longitudinal sectional view of a first embodiment of an electromagnetic actuator of the present invention with parts removed.

FIG. 1 illustrates one embodiment of an electromagnetic actuator 10 made in accordance with the present invention.

As will be explained and understood in the following description, the actuator 10 is selectively controlled for precisely controlling bidirectional displacement of an armature 12 relative to a stator assembly 14.

Figure 2:
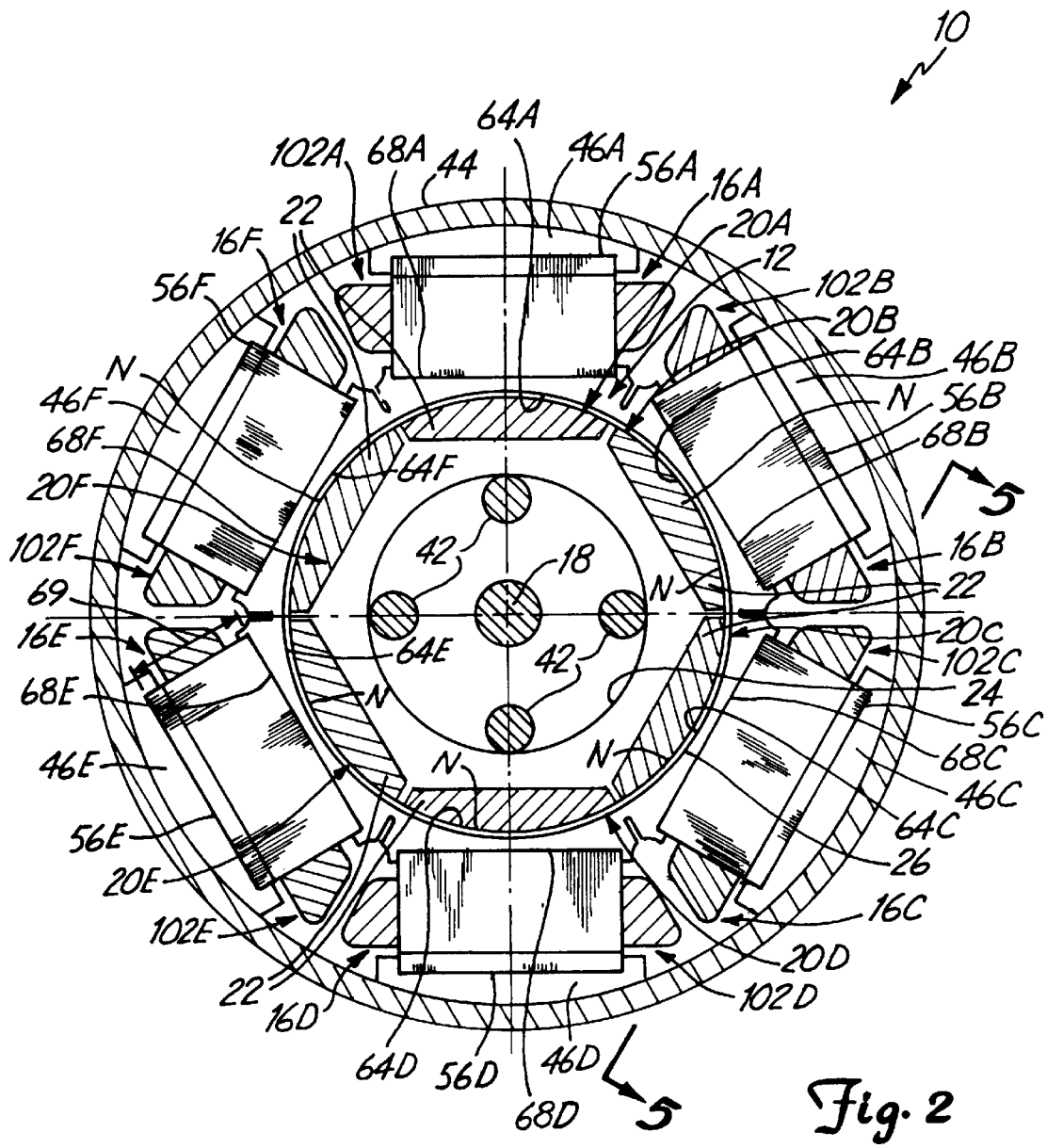
FIG. 2 is a sectional view of the electromagnetic actuator of FIG. 1 taken along lines 2—2.

Generally, as illustrated in FIG. 2, the electromagnetic actuator 10 includes a plurality of stator winding assemblies 16A, 16B, 16C, 16D, 16E and 16F spaced at equal angular intervals about a longitudinal axis 18. Each stator winding assembly 16A–16F faces a plurality of magnetic assemblies 20A, 20B, 20C, 20D, 20E and 20F disposed in the armature 12. As illustrated, the magnetic assemblies 20A–20F are disposed about the longitudinal axis 18 at the same angular intervals as the stator winding assemblies 16A–16F. Although electromagnets can be used, preferably each of the magnetic assemblies 20A–20F comprises a bank of permanent magnets 22 disposed parallel to the longitudinal axis 18 along a substantial part of the armature 12 as illustrated in FIG. 1. The poles of each magnet 22 are radially disposed so that the corresponding magnetic field from each magnet 22 extends radially from the longitudinal axis 18. Preferably, the permanent magnets are made of Neodymium-Iron-Boron (NdFeB) material.

As is commonly known, every magnet has two poles designated conventionally as "N" and "S". FIG. 1 illustrates that the magnets 22 of magnetic assemblies 20A and 20D are disposed with alternating polarity along the longitudinal axis 18. Preferably, the magnets of magnetic assemblies 20B, 20C, 20E and 20F are similarly arranged so that as illustrated in FIG. 2, the polarity of the outwardly facing surfaces are the same about the longitudinal axis 18 for a given position along the longitudinal axis 18.

Generally, each stator winding assembly 16A–16F and each corresponding magnetic assembly 20A–20F as a set comprise a linear motor when the stator winding assemblies 16A–16F are suitably energized. By disposing the stator winding assemblies 16A–16F and the magnetic assemblies 20A–20F about the longitudinal axis 18 at equal angular intervals, forces in a plane perpendicular to the longitudinal axis 18 are substantially zero, while forces generated from interaction of each energized stator winding assembly 16A–16F with its corresponding magnetic assembly 20A–20F add together and are parallel to the longitudinal axis 18.

In the preferred embodiment, the armature 12 is tubular having an inner longitudinal cavity 24. Preferably, the magnets 22 of the magnetic assemblies 20A–20F are disposed within the armature 12 below an outer surface 26. The armature 12 is formed of a plurality of armature subsections 28 containing a magnet 22 of each magnetic assembly 20A–20F, one of which is illustrated in FIG. 4. Preferably, each armature subsection 28 is formed of a plurality of armature laminates 30, one of which is also illustrated in FIG. 3B.

The armature laminate 30 is very thin (approximately 1/16 of an inch thick), but when a number of these are stacked and suitably fastened together such as by gluing, the armature subsection 28 is formed. It should be understood that as used herein an "armature laminate" is defined as having a width less than a width of magnet 22, while a "armature subsection" comprises a plurality of armature laminates 30. Each armature laminate 30 is made of a suitable low reluctance material such as silicon steel.

Figure 3:
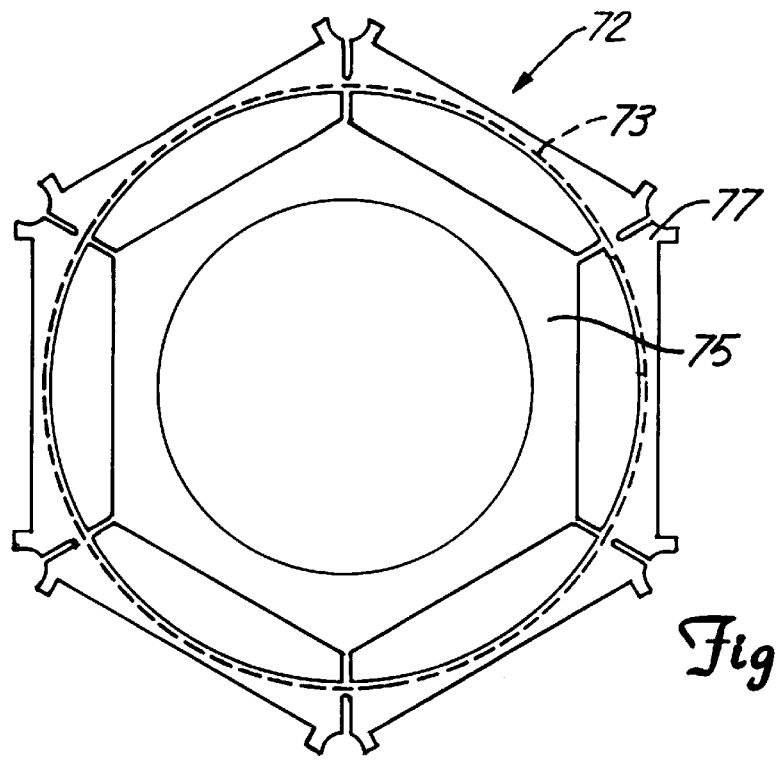
FIG. 3 is a top plan view of a laminate having a stator pole portion and an armature portion.
Figure 3A:
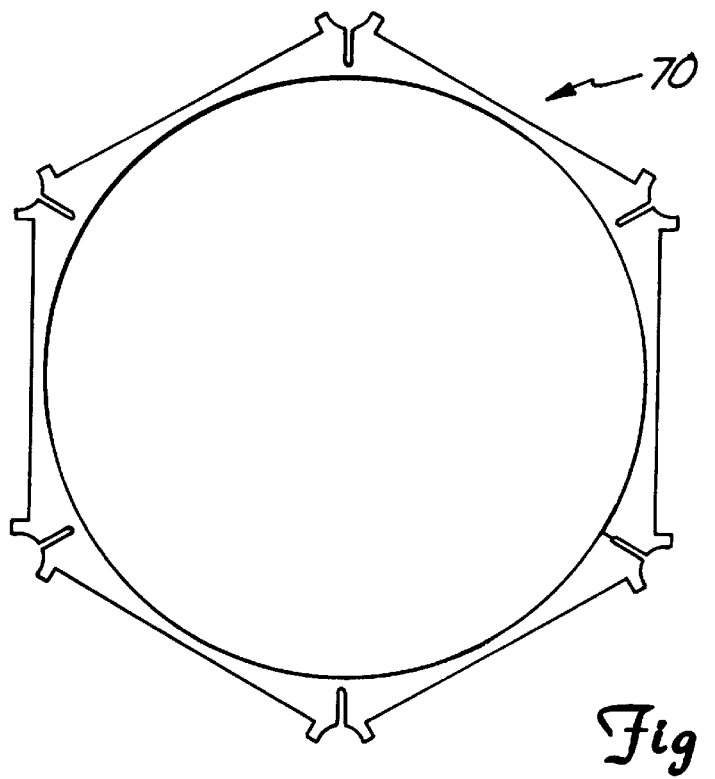
FIG. 3A is a top plan view of a stator pole laminate.
Figure 3B:
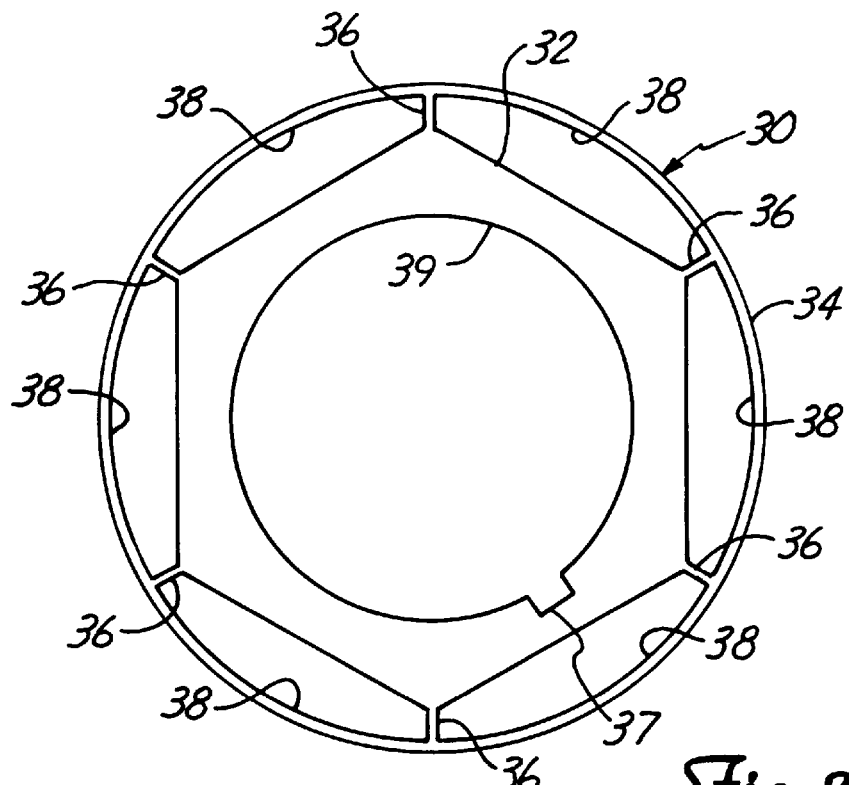
FIG. 3B is a top plan view of an armature laminate.
Figure 4:
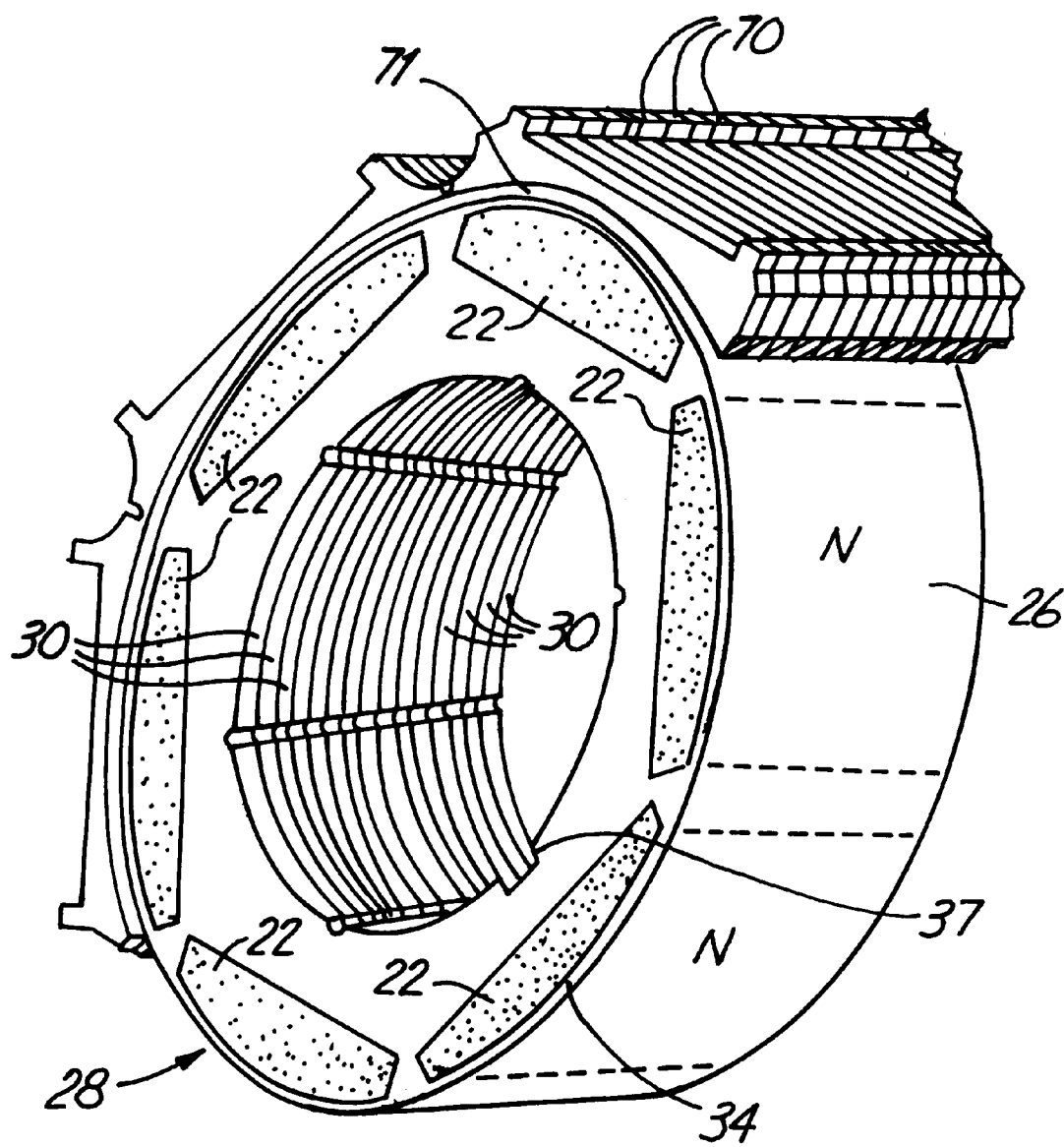
FIG. 4 is a perspective view of a subsection of the actuator rod and a portion of the stator pole face laminates.

Referring to FIG. 3B, each armature laminate 30 has the same cross-sectional shape as the subsection 28, and thus the armature 12. The armature laminate 30 includes an inner support portion 32 joined to an outer ring portion 34 with webs 36. The inner support portion 32, the outer ring portion 34 and successive webs 36 define apertures 38 which are used to hold the magnets 22 as illustrated in FIG. 2 and 4. A notch 37 is provided in each armature laminate 30 for aligning the armature laminates 30 during assembly of the armature subsection 28. An opening 39 is provided in each armature laminate 30 so as to form the open cavity 24 (FIG. 1) when assembled.

Referring back to FIG. 1, the subsections 28 are then glued together to form the armature 12. End caps 38 and 40 are secured at each end. Since subsection 28A closest to end cap 38 would not extend under the stator windings 16A–16F, a suitable filler material 39 can be used in place of the magnets 22. Preferably, a suitable fastening device, such as bolts 42, extends between the end caps 38 and 40 within the cavity 24 to further secure the subsections 28 together. To create the smooth outer cylindrical surface 26 on the armature 12, once assembled, the outer surface 26, or more particularly, the outer ring portions 34 (FIG. 3B) of the armature laminates 30 are ground smooth and plated with electrolysis nickel for corrosion protection to provide a smooth surface for bearings 52 and 54 to slide on.

As illustrated in FIGS. 2 and 4, the magnets 22 are separated from each other and oriented so that the like poles face outwardly and inwardly. It should be understood that tubular shaped magnets (having poles on inner and outer cylindrical surfaces), such as available from Daido Steel Co. Ltd. of Nagoya 457 Japan can also be used, if desired.

The stator winding assemblies 16A–16F are supported in a housing 44 by corresponding support blocks 46A, 46B, 46C, 46D, 46E and 46F. If desired, the support blocks 46A–46F can be formed integral with the housing 44. End caps 48 and 50 are joined to the housing 44 at opposite ends thereof. Apertures 48A and 50A within end caps 48 and 50, respectively, allow the armature 12 to move through the stator assembly 14. The bearing elements 52 and 54 are positioned within end caps 48 and 50, respectively, and engage the outer surface 26 to guide the armature 12 through the stator assembly 14.

Figure 5:
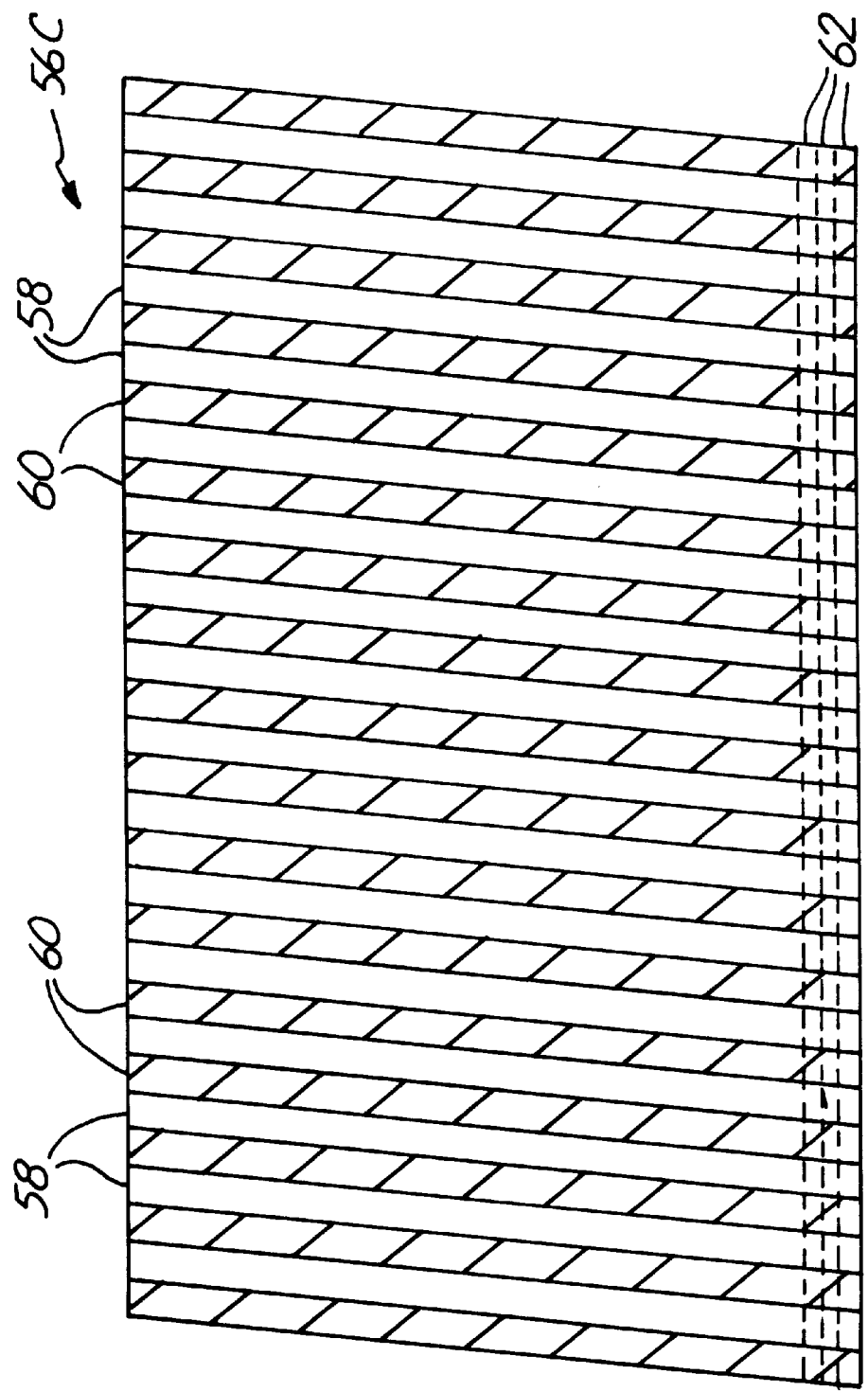
FIG. 5 is a sectional view of a stator winding core taken along lines 5—5 of FIG. 2.

Referring to FIGS. 1, 2 and 5, each of the stator winding assemblies 16A–16F includes a suitable low reluctance core structure 56A, 56B, 56C, 56D, 56E and 56F, respectively. The core structures 56A–56F include recesses 58 that form teeth 60. In FIG. 1, the windings for stator winding assemblies 16A and 16D have been removed to illustrate an elevational view of the core structures 56A and 56D. Preferably, each core structure 56A–56F comprises a plurality of identical stator core laminates 62 formed from a suitable low reluctance material such as silicon steel. Referring to FIG. 5, when joined together, the stator core laminates 62 form a parallelogram structure to provide smoother displacement of the armature 12 through the stator assembly 14.

Referring to FIG. 5A, preferably, the orientation of each core structure 56A–56F alternates about the longitudinal axis. As appreciated by those skilled in the art, the parallelogram structure of the core structures 56A–56F will generate a force vector having a substantial vector component parallel to the longitudinal axis 18 and a smaller vector component that would tend to rotate the armature 12 about the longitudinal axis. However, when the core structures 56A and 56F are oriented as illustrated in FIG. 5A about the longitudinal axis, the smaller vector components will substantially cancel each other out.

To minimize the air gap between each stator winding assembly 16A–16F and each corresponding magnetic assemblies 20A–20F, each stator winding assembly 16A–16F includes a stator pole face 64A, 64B, 64C, 64D, 64E and 64F, respectively. As illustrated, each stator pole face 64A–64F generally conforms to the portion of the outer surface 26 that it faces. The stator pole faces 64A–64F have recesses 68A, 68B, 68C, 68D, 68E and 68F that have a width equal to the width of the corresponding core structures 56A–56F formed by stator core laminates 62. Preferably, the stator pole faces 64A–64F are integrally joined together as illustrated and are formed from a plurality of stator pole laminates 70, one of which is illustrated in FIG. 3A. The stator pole laminates 70 are preferably just as thick as the armature laminates 30 discussed above. A preferred method of making the armature laminates 30 and the stator pole laminates 70 so that a precision air gap 71 (FIG. 4) results between the outer surface 26 and the stator pole faces 64A–64F includes beginning with a plurality of laminates of the shape indicated at 72 in FIG. 3. As separated by dashed circle 73, the laminate 72 includes both an inner portion 75 having a shape identical to the armature laminate 30 and an outer portion 77 having a shape identical to the stator pole laminate 70. By separating the inner portion 75 from the outer portion 77 along the dashed circle 73, for example by stamping or laser machining, an accurate and consistent air gap 71 can be achieved between the outer surface 26 and the stator pole faces 64A–64F. Although stator core laminates 62 can be individually extended (indicated by arrow 69 in FIG. 2) and/or positioned so that each core structure 56A–56F has an inner surface facing the armature 12 that generally conforms to the outer surface 26 without the use of the stator pole faces 64A–64F, this structure would increase the number of unique parts present in the actuator 10 and/or complicate assembly. Instead, since the armature laminates 30 are identical to each other, the stator core laminates 62 are identical to each other and the stator pole laminates 70 are identical to each other, the number of individual parts is reduced and assembly is simplified.

It should be understood that the present invention is not limited to the use of circular armature laminates 30 as herein depicted. For instance, if desired, the armature laminates 30 can have any suitable cross-sectional shape such as but not limited to a triangle, rectangle, hexagon or octagon shape. When the armature laminates 30 and the stator pole laminates 70 are formed from laminates 72 in the manner described above, inner surfaces of the stator pole laminates 70 conform to the outer ring portions 34 of the armature laminates 30 to minimize the air gap formed between the armature 12 and the stator pole faces 64A–64F.

Extension of the armature 12 out of the stator assembly 14 is limited by the end cap 38 striking a suitable bumper 80 provided on the end cap 48. A protective tube 82 extends away from the end cap 48. The protective tube 82 has an end cap 84 located at its distal end 86. Retraction of the armature 12 within the protective tube 82 is limited by contact of the end cap 38 upon a bumper 88 joined to an inner surface of end cap 84.

Figure 6:
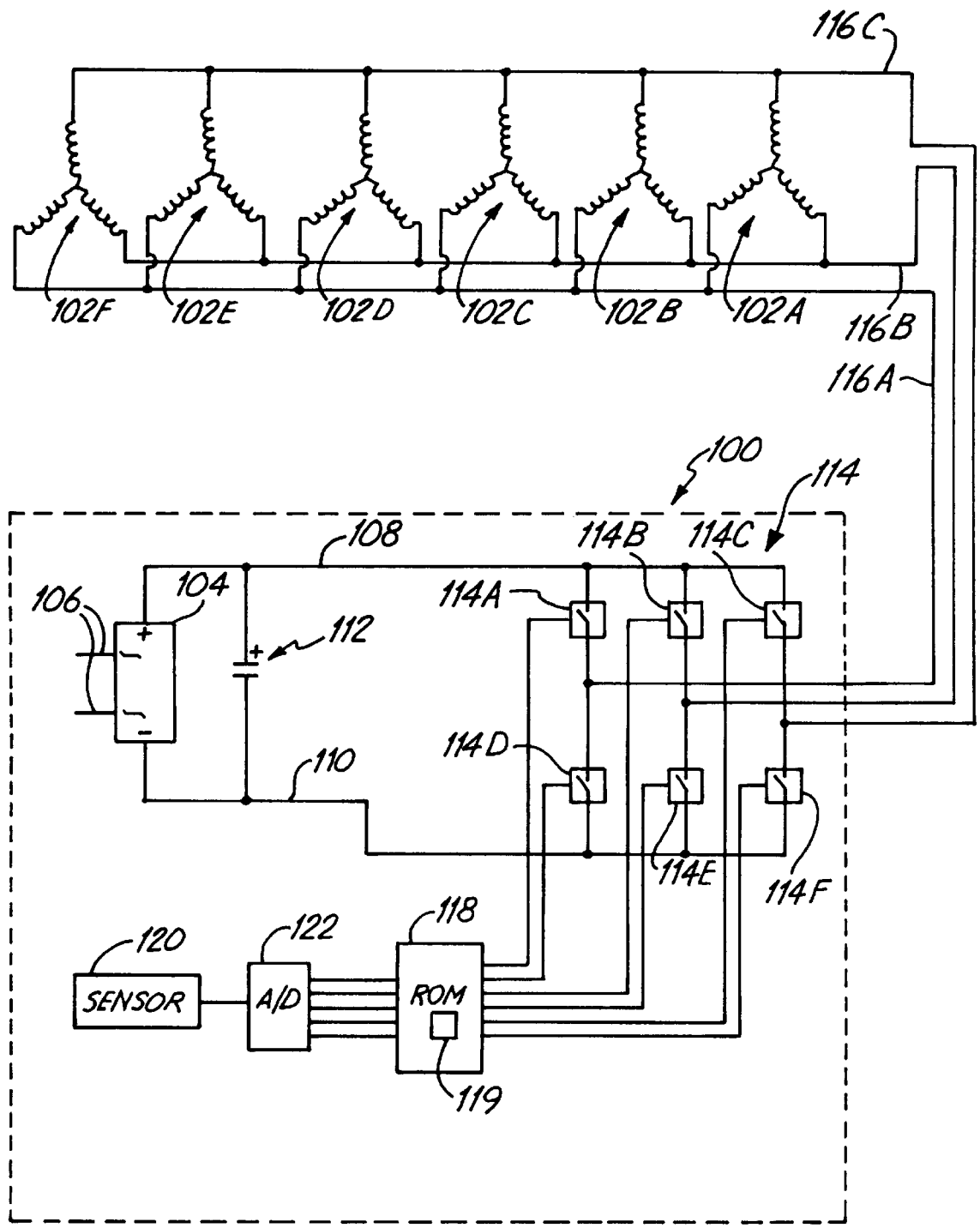
FIG. 6 is a block and schematic diagram of an actuator controller.

FIG. 6 illustrates components of a controller 100 used to energize stator windings 102A, 102B, 102C, 102D, 102E and 102F of stator winding assemblies 16A–16F, respectively. As illustrated, the stator windings 102A–120F are connected in a wye or star configuration; however, if desired, the stator windings 102A–102F can be connected in a delta configuration.

Generally, the controller 100 is similar to known controllers used in brushless, direct current, permanent magnet motors. The controller 100 includes a rectifier 104 that receives a suitable alternating current input signal on signal lines 106 to produce fixed positive and negative DC voltages on a positive bus 108 and a negative bus 110, respectively. A capacitor 112 is provided to maintain the positive bus 108 and the negative bus 110 within suitable limits. A three-phase inverter 114 is connected to the positive bus 108 and the negative bus 110 in a conventional manner to provide three-phase commutated current waveforms on power signal lines 116A, 116B and 116C, which are connected to the set of stator windings 102A–102F. The three-phase inverter 114 comprises a power transistor bridge having solid state transistors 114A, 114B, 114C, 114D, 114E and 114F for switching each of the signal lines 116A–116C from an open circuit condition to the positive bus 108 or the negative bus 110. The duty cycle of each transistor 114A–114F is controlled by an inverter driver 118, herein illustrated as a logic array having a look-up table 119 stored in read only memory (ROM). The inverter driver 118 responds to armature position feedback signals provided from a suitable sensor such as an LVDT sensor 120. Preferably, as illustrated in FIG. 1, the sensor 120 is disposed within the cavity 24 and mounts at one end to the end cap 84 of the protective tube 82 and at an opposite end to the end cap 40.

Referring back to FIG. 6, an analog-to-digital converter 122 receives analog signals from the sensor 120 and converts the signals to a binary format suitable for the inverter driver 118. The binary format provides an index into the look-up table 119 to determine which transistors 114A–114F should be operated to properly commutate the stator windings 102A–102F as a function of the position of the armature 12. It should be understood that the inverter driver 118 is but one embodiment for providing control signals to the transistors 114A–114F. Suitable combinational logic could also be used instead of the logic array herein depicted.

Figure 7:
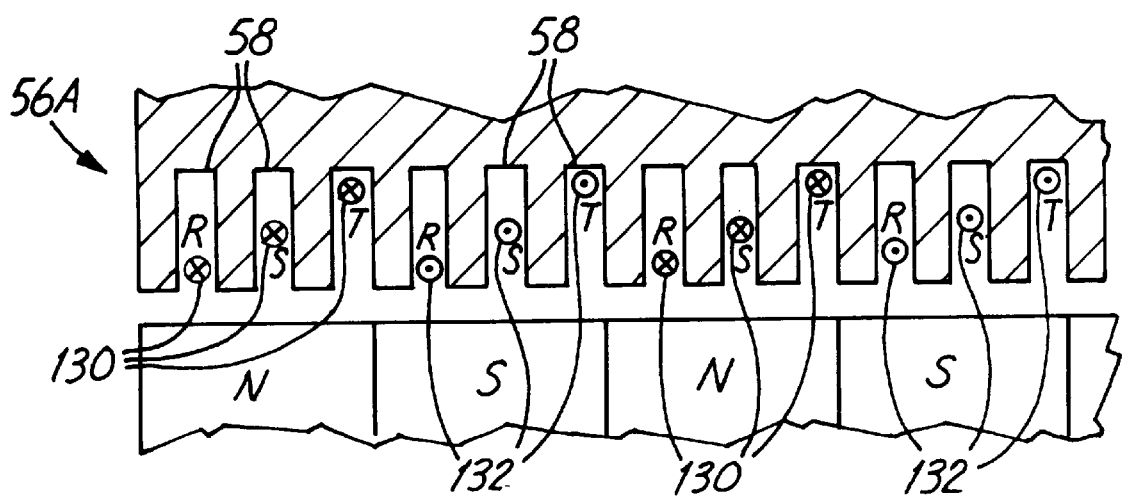
FIG. 7 is a diagrammatic view of three phase windings in a stator winding core and armature magnets.

FIG. 7 diagrammatically illustrates placement of the three phase windings (R,S and T) within the recesses 58 of the core structure 56A by way of example. Winding portions 130A indicate the flow of current therethrough is into the plane of the drawing, while winding portions 132A indicate the flow of current therethrough is out of the plane of the drawing.

Figure 8:
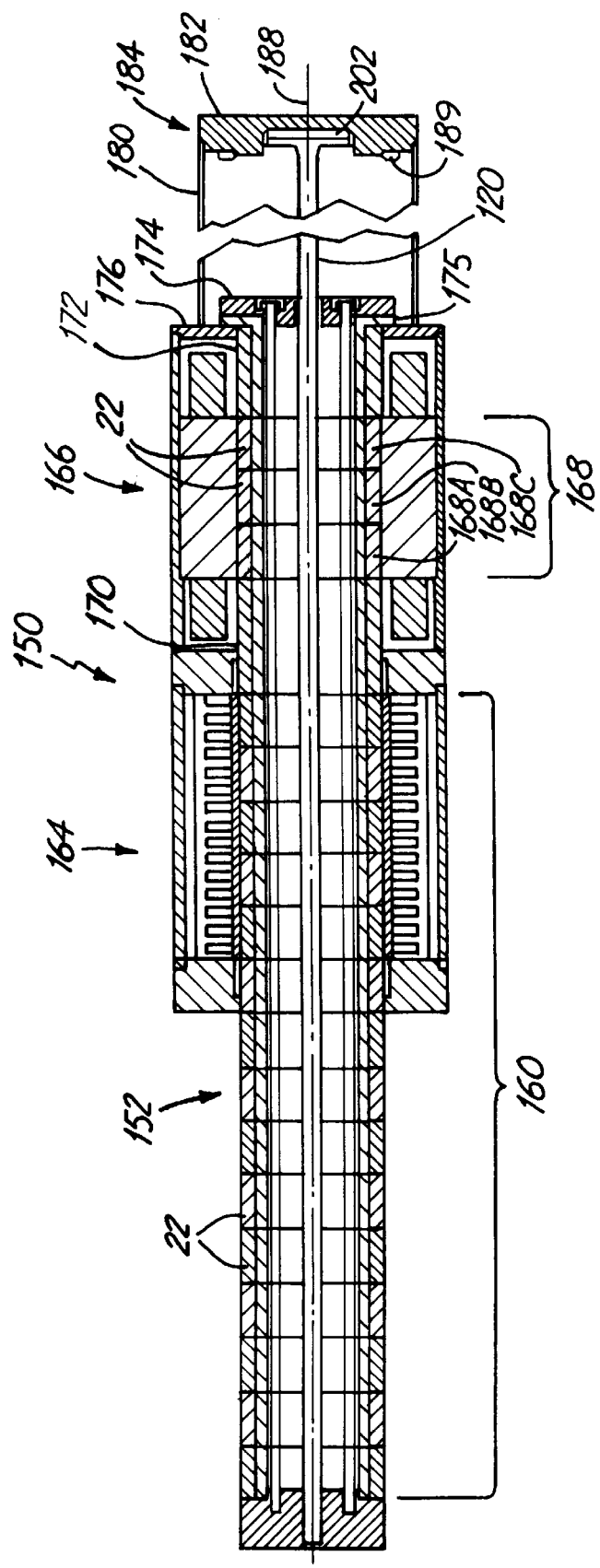
FIG. 8 is a longitudinal sectional view of a second embodiment of the electromagnetic actuator of the present invention with parts removed.

FIG. 8 illustrates a second embodiment of an electromagnetic actuator 150 made in accordance with the present invention. Like the actuator 10 described above, the actuator 150 includes an armature 152 that moves linearly with respect to the a longitudinal axis 158. However, in addition, the actuator 150 can selectively rotate the armature 152 about the longitudinal axis 158.

The armature 152 includes a first portion 160 having magnets 22 oriented and disposed therein in the manner described above with respect to armature 12. A stator assembly 164 similar to the stator assembly 14 is disposed around the longitudinal axis 158 and interacts with the portion 160 of the armature 152 to displace the armature 152 parallel to the longitudinal axis 158.

The actuator 150 also includes a stator assembly 166 conventionally wound to operate as an electric motor. In the embodiment illustrated, the stator assembly 166 forms part of a brushless, direct current, permanent magnet electric motor wherein the armature 152 includes a second armature portion 168 having magnets 22 oriented conventionally to operate as an electric motor.

Figure 9:
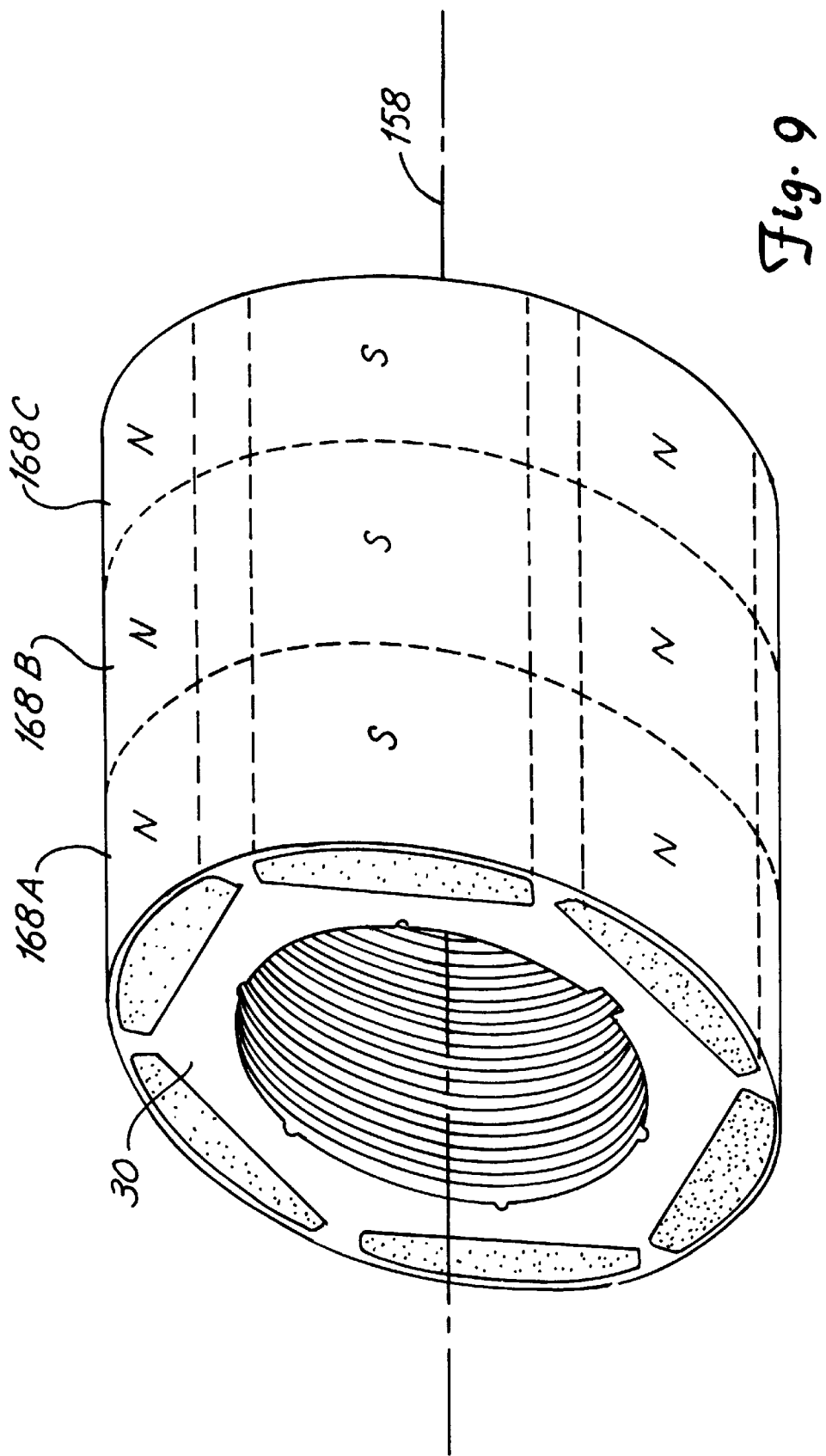
FIG. 9 is a perspective view of a portion of an armature of the second embodiment.
Figure 10:
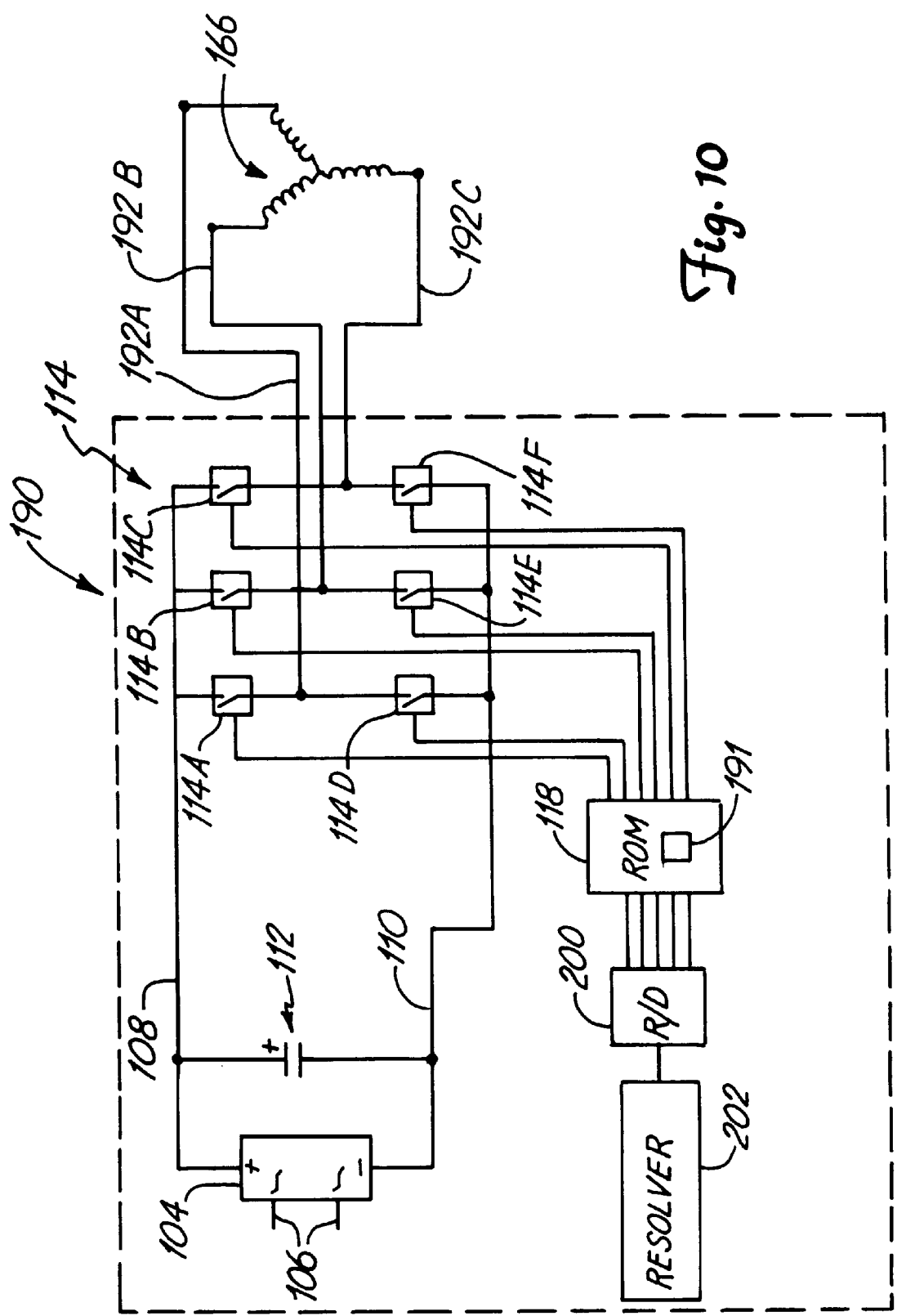
FIG. 10 is a block and schematic diagram of a motor controller.

As illustrated in FIG. 9, the armature portion 168 includes three identical subsections 168A. 168B and 168C joined together and formed from armature laminates 30 in the manner described above. As illustrated, the magnets 22 of the armature 168A–168C are disposed with alternating polarity about the longitudinal axis 158, while magnets of the same polarity are disposed parallel to the longitudinal axis 158.

The armature portion 168 is joined to the armature portion 160 with a first tubular member 170, while a second tubular member 172 extends toward an end cap 174. The tubular members 170 and 172 can be solid tubes or can be formed from armature laminates 30 having suitable fillers used in place of the magnets 22. Extension of the armature 152 out of the stator assembly 164 is limited by the end cap 174 engaging a suitable bearing element 175 mounted to the armature 152. The bearing element 175 allows rotation of the armature 152 about the axis 158 when desired. As appreciated by those skilled in the art, the bearing element 175 can also be mounted to the end cap 176 if desired. A protective tube 180 extends away from the end cap 176. The protective tube 180 has an end cap 182 located at its distal end 184. Retraction of the armature 152 within the protective tube 180 is limited by contact of the end cap 174 with a bumper 189 joined to an inner surface of the end cap 182.

The stator assembly 166 is connected to a suitable motor controller 190 through lines 192A, 192B, 192C. The motor controller 190 is similar to the actuator controller 100 described above, accordingly, like components have been similarly numbered. A resolver-to-digital converter 200 receives analog signals from a resolver 202 and converts the signals to a binary format suitable for the inverter driver 118 of the motor controller 190. The binary format provides an index into a look-up table 191 to determine which transistors 114A–114F should be operated to properly commutate the stator windings 166 as a function of the angular position of the armature 12. It should be understood that the resolver 202 is but one embodiment for sensing the angular position of the armature 152. Any suitable sensor such as an encoder or Hall effect sensors could also be used.

Referring back to FIG. 8, the actuator 150 displaces the armature 152 along the axis 158 as well as rotates the armature 152 about the axis 158. In the embodiment illustrated, when the armature 152 is fully extended, the armature portion 168 is aligned with the stator assembly 166 to allow operation of the motor thereof to rotate the armature 152. It should be understood that the armature portion 168 can be lengthened, or positioned, or additional armature portions 168 can be added to allow the armature 152 to be rotated at any extended condition.

Although the present invention has been described with reference to preferred embodiments, workers skilled in the art will recognize that changes may be made in form and detail without departing from the spirit and scope of the invention.

What is claimed is:

1. An electromagnetic actuator comprising:

an actuator rod comprising:
      a first plurality of magnetic assemblies disposed about a longitudinal axis of the actuator rod, wherein the magnetic assemblies are disposed to develop alternate magnetic flux along the longitudinal axis;
      a second plurality of magnetic assemblies disposed about a longitudinal axis of a second portion of the actuator rod, wherein the magnetic assemblies develop alternate magnetic flux about the longitudinal axis;
   a support structure;
   a first plurality of stator winding assemblies secured to the support structure and disposed about the longitudinal axis, the first plurality of stator winding assemblies being operable with the first plurality of magnetic assemblies to move the actuator rod longitudinally along the longitudinal axis from a first position to a second position; and
   a second plurality of stator winding assemblies secured to the support structure and disposed about the longitudinal axis, the second plurality of stator winding assemblies being operable with the second plurality of magnetic assemblies to rotate the actuator rod about the longitudinal axis when the actuator rod is in the second position.

2. The electromagnetic actuator of claim 1 wherein the first plurality of stator winding assemblies comprises at least one stator winding is staggered relative to the other stator windings along the longitudinal axis.

3. The electromagnetic actuator of claim 1 wherein the first plurality of stator winding assemblies comprises a set of three phase windings.

4. The electromagnetic actuator of claim 1 wherein the second plurality of stator winding assemblies comprises a set of three phase windings.

5. The electromagnetic actuator of claim 1 wherein each magnetic assembly comprises a plurality of magnets.

6. The electromagnetic actuator of claim 1 and further comprising:
   a first commutation circuit connected to the first plurality of stator winding assemblies; and
   a second commutation circuit connected to the second plurality of stator winding assemblies.

* * * * *